US008054857B2

(12) United States Patent
Noeldner

(10) Patent No.: US 8,054,857 B2
(45) Date of Patent: Nov. 8, 2011

(54) TASK QUEUING METHODS AND SYSTEMS FOR TRANSMITTING FRAME INFORMATION OVER AN I/O INTERFACE

(75) Inventor: David Noeldner, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 1336 days.

(21) Appl. No.: 10/960,170

(22) Filed: Oct. 7, 2004

(65) Prior Publication Data
US 2006/0078002 A1    Apr. 13, 2006

(51) Int. Cl.
*H04J 3/24*    (2006.01)
(52) U.S. Cl. ........................................ 370/474; 709/236
(58) Field of Classification Search .................. 370/359, 370/412, 474, 476, 463; 709/223–226, 201, 709/202, 205, 212–216, 236, 245, 250; 710/30, 710/3, 4, 13, 20–23, 33–35; 712/10, 38
See application file for complete search history.

(56) References Cited

U.S. PATENT DOCUMENTS

| | | | |
|---|---|---|---|
| 5,459,453 A | 10/1995 | Minerd et al. | 340/825 |
| 5,553,302 A | 9/1996 | Morrissey et al. | 395/825 |
| 6,173,386 B1 * | 1/2001 | Key et al. | 712/10 |
| 6,438,137 B1 * | 8/2002 | Turner et al. | 370/466 |
| 6,636,530 B1 * | 10/2003 | O'Brien | 370/476 |
| 6,671,767 B2 | 12/2003 | Furuumi et al. | 711/100 |
| 6,697,890 B1 | 2/2004 | Gulick et al. | 710/62 |
| 6,715,094 B2 | 3/2004 | Jacobs | 713/400 |
| 6,721,320 B1 | 4/2004 | Hoglund et al. | 370/392 |
| 6,728,794 B2 | 4/2004 | Robinson et al. | 710/8 |
| 6,789,050 B1 * | 9/2004 | Reeser et al. | 703/2 |
| 7,120,149 B2 * | 10/2006 | Salamat | 370/394 |
| 7,239,645 B2 * | 7/2007 | Suri et al. | 370/412 |
| 2002/0054591 A1 * | 5/2002 | Oyama | 370/386 |
| 2003/0002267 A1 | 1/2003 | Mantz et al. | 361/767 |
| 2003/0042941 A1 | 3/2003 | Wang et al. | 327/108 |
| 2003/0126319 A1 | 7/2003 | Adusumilli et al. | 710/22 |
| 2004/0012417 A1 | 1/2004 | Hill | 327/141 |

(Continued)

OTHER PUBLICATIONS

"Serial Attached SCSI and Serial ATA Compatiblity", SCSI Trade Association, White Paper, Authored by Intel on Behalf of the STA, 2002.

(Continued)

*Primary Examiner* — Ricky Ngo
*Assistant Examiner* — Kan Yuen
(74) *Attorney, Agent, or Firm* — Kermit D. Lopez; Luis M. Ortiz; Ortiz & Lopez, PLLC

(57) ABSTRACT

Data-processing systems and methods are disclosed, including an I/O interface for managing the transfer of data between a processor and at least one memory. A processor can be associated with the I/O interface, such that the processor generically assembles a first or prior frame from among a plurality of frames, transmits the first or prior frame from among the plurality of frames over the I/O interface and thereafter processes and assembles a subsequent or second frame from among the plurality of frames while the first frame is transmitting, thereby providing enhanced flexibility and speed for the assembly and transmission of the plurality of frames across the I/O interface. The methods and systems disclosed also permit processor (i.e., software control) flexibility in managing the overall order and priority of frame transmission and protocol management, while enhancing hardware performance with respect to the sending of frames and control sequences without requiring real time interaction from the processor.

18 Claims, 3 Drawing Sheets

U.S. PATENT DOCUMENTS

| | | | |
|---|---|---|---|
| 2004/0015654 A1 | 1/2004 | Furuumi et al. | 711/113 |
| 2004/0015751 A1 | 1/2004 | Gauthier et al. | 714/712 |
| 2004/0153494 A1* | 8/2004 | Mukund et al. | 709/200 |
| 2005/0021879 A1* | 1/2005 | Douglas | 710/5 |
| 2005/0041674 A1* | 2/2005 | Rooney | 370/401 |
| 2005/0047404 A1* | 3/2005 | Kim et al. | 370/382 |
| 2005/0251673 A1* | 11/2005 | Bosley et al. | 713/2 |

OTHER PUBLICATIONS

"Serial Interfaces in the Enterprise Environment," White Paper, Willis Whittington, ESG Interface Planning, Seagate, Dec. 2002, No. TP-306.

* cited by examiner

TASK QUEUING METHODS AND SYSTEMS FOR TRANSMITTING FRAME INFORMATION OVER AN I/O INTERFACE

TECHNICAL FIELD

Embodiments are generally related to data-processing methods and systems. Embodiments are also related to the field of communication networks and system interconnections between computing and communication devices and instrumentation. Embodiments are additionally directed to data-processing and computer input/output (I/O) data transmission methods and systems.

BACKGROUND OF THE INVENTION

In a conventional data-processing system, such as a computer and/or a computer network, one or more processors may communicate with input/output (I/O) devices over one or more buses. The I/O devices may be coupled to the processors through an I/O interface such as an I/O bridge, which can manage the transfer of information between a peripheral bus connected to the I/O devices and a shared bus connected to the processors. Additionally, the I/O interface may manage the transfer of information between a system memory and the I/O devices or the system memory and the processors.

An I/O interface can also be utilized to transfer information between I/O devices and main storage components of a host processor. An I/O channel, for example, may connect the host directly to a mass storage device (e.g., disk or tape drive). In the case of a mainframe host processor, the channel is usually coupled to one or more device controllers. Each device controller can in turn be connected to a plurality of mass storage devices.

One example of an I/O interface that is become widely utilized in the data-processing and computer arts is the so-called "Fibre Channel." In general, features of both channels and networks have been incorporated into a network standard known as "Fibre Channel," which has been defined by American National Standards Institute (ANSI) specifications, such as X3.230 (1994). Fibre Channel systems attempt to combine the speed and reliability of channels with the flexibility and connectivity of networks.

In general, data in a Fibre Channel network can be transported in packets, which may be two kilobytes or smaller. These packets of data can be referred to as "frames." "Sequences" include one or more frames. Frames in a sequence are generally assembled at the receiving device in a predetermined order before the sequence can be considered complete.

Fibre Channel is a campus-wide interconnection standard that is designed primarily to interconnect peripherals, mass storage systems such as redundant arrays of inexpensive disks (RAID), imaging and archiving systems, mainframes, engineering workstations, and other high speed devices. Often seen as the successor to the Small Computer Serial Interface (SCSI) standard, Fibre Channel is a high-speed channel that typically uses fiber optics to interconnect computing devices in a relatively local environment, such as a laboratory or a campus. Thus, the Fibre Channel focuses more on providing bandwidth between devices than a completely flexible network. Fibre Channel is a switched technology.

The Fibre Channel interface dedicates circuits for transferring data while allowing other devices to access the channel when it is free. The Fibre Channel interface supports variable length transmissions; it can transmit large blocks of data without dividing the blocks into smaller packets. The speed of Fibre Channel is in the range of 133 Mbit/sec-1062 Mbit/sec. While multimode optical fiber is used most often, single mode optical fiber, coaxial cable, and shielded twisted pair wire are also occasionally used in practice. An example of a Fibre Channel method and system is disclosed in U.S. Pat. No. 6,721,320, which issued on Apr. 13, 2004 to Hoglund et al and is assigned to LSI Logic Corporation based in Milpitas, Calif. U.S. Pat. No. 6,721,320 is incorporated herein by reference.

Another well-known I/O interface is Serial Attached SCSI (SAS). SAS incorporates feature of Small Computer System Interface (SCSI), also known as "skuzzy", which is a bus protocol that allows various internal and external devices to be connected to personal computers, workstations, servers, and/or other data-processing systems. SAS is a is a point-to-point architecture, distinct from parallel technologies in which devices are connected utilizing shared-access topologies, such as a Fibre Channel arbitrated loop of the SCSI bus. As such, a point-to-point architecture establishes a link directly from the controller to a disk drive or through an expander switching matrix. In shared-access topologies, only two devices can communicate at once. As well, as throughput needs increase, the shared-access medium can become a bottleneck and slow down communication. Shared access topologies also are typically more complex and have arbitration schemes that are more time consuming than point-to-point architectures.

Despite recent advances in such I/O interface technologies, users of I/O interfaces are still faced with some inherent difficulties. For example, when assembling frames for transmission over an I/O interface (e.g., SAS, Fibre Channel, and the like), a user requires flexibility and speed to assemble and transmit the frame data. Conventional I/O methods and systems handle frame transmission utilizing hardware or state machines to assemble and transmit a frame. Custom hardware, on the other hand, is fast, but is not flexible and does not adapt well to changing requirements in assembling a frame. This is one of the advantages of custom hardware, such as, for example, a custom state machine.

Alternative I/O methods and systems permit the processor to manually assemble and transmit each frame. Current hardware solutions do not offer the flexibility required for new interface protocols, because such solutions change quickly or are not defined completely. In practice, much variation exists in how the I/O protocols are handled, thus flexibility is important. Also, utilizing a processor for assembly and transmission of a frame is very slow, inefficient, and produces poor performance results. Additionally, processor interactions can cause poor protocol performance. A slow processor, for example, may be tied directly to the performance of the protocol.

It is therefore believed that a solution to such drawbacks lies in the development of a processor that can actually assemble frames in a completely generic fashion and then send the frames over a link, while processing and assembling the next frame for transmission. Such features are not known in conventional frame management methods and systems, but are inherent to the embodiments disclosed herein.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide for improved data-processing methods and systems.

It is another aspect of the present invention to provide for improved communication networks and system interconnections between computing and communication devices and instrumentation.

It is yet another aspect of the present invention to provide for data-processing and computer input/output (I/O) data transmission methods and systems.

It is a further aspect of the present invention to provide for an improved task queuing architecture for transmitting frames over an I/O interface in a data-processing system, such as, for example, a computer.

The above and other aspects of the invention can be achieved as will now be briefly described. Data-processing systems and methods are disclosed herein, including an I/O interface for managing the transfer of data between a processor and at least memory. A processor can be associated with the I/O interface, such that the processor generically assembles a first or prior frame from among a plurality of frames, transmits the first or prior frame from among the plurality of frames over the I/O interface and thereafter processes and assembles a subsequent or second frame from among the plurality of frames while the first frame is transmitting, thereby providing enhanced flexibility and speed for the assembly and transmission of the plurality of frames across the I/O interface.

The processor itself can be structured to include a task queue containing a plurality of transmit tasks for transmitting the plurality of frames over the I/O interface, at one or more processing units for executing the plurality of transmit tasks, a memory; and interface logic for accessing the memory and the task queue. The processing unit can be implemented as a custom processor for driving the task queue. A transmit word router can also be provide, which communicates with a transmit frame router that includes the actual task queue. Additionally, a plurality of buffers can be provided for maintaining the plurality of frames prior to, during and after transmission of the plurality of frames. Such buffers or memory locations can include a data buffer, a staging buffer, and/or a generic buffer. Such buffers may constitute Random Access Memory (RAM). The I/O interface may be a Fibre Channel interface, a Serial Attached SCSI (SAS) interface, and the like.

In general, the embodiments disclosed herein can provide custom hardware that allows a processor to assemble frames, while providing the flexibility of processor control with the speed of custom hardware. The methods and systems disclosed also permit processor (i.e., software control) flexibility in managing the overall order and priority of frame transmission and protocol management, while enhancing hardware performance with respect to the sending of frames and control sequences without requiring real time interaction from the processor.

BRIEF DESCRIPTION OF THE DRAWINGS

The accompanying figures, in which like reference numerals refer to identical or functionally-similar elements throughout the separate views and which are incorporated in and form part of the specification, further illustrate embodiments of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

Figure 1:
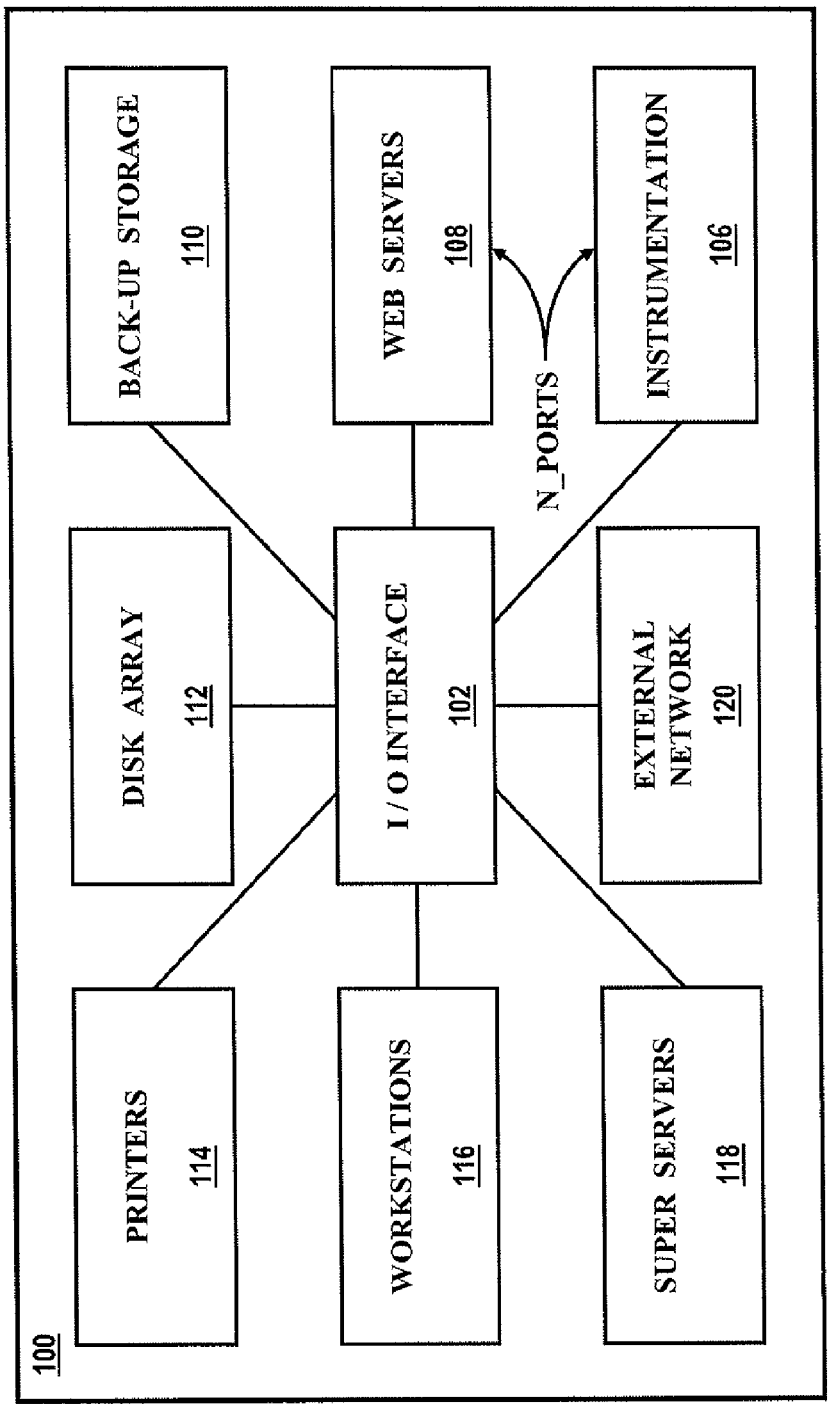
FIG. 1 illustrates a block diagram of a system in which one embodiment of the present invention can be implemented.

FIG. 1 illustrates a block diagram of a system 100 in which a preferred embodiment of the present invention can be implemented. System 100 generally includes an I/O Interface 102, which can communicate with one or more N_Port devices, such as, for example, instrumentation 106, Web servers 108, back-up storage 110, disk arrays 112, printers 114, workstations 116, super servers 118 and an external network 120. I/O interface 102 can be, for example, a Fibre Channel switch or a Serial Attached SCSI (SAS) interface, depending upon design considerations.

System 100 can therefore be implemented in the context of a Fibre Channel switching fabric configured in a switched configuration 100. It can be appreciated that system 100 is presented for general illustrative and exemplary purposes only and is not considered a limiting feature of the embodiments disclosed herein. For example, I/O Interface 102 can be implemented as interfaces other than a Fibre Channel switch. For illustrates purposes, however, it can be assumed that I/O Interface 102 functions as a Fibre Channel Switch.

In the example of system 100 of FIG. 1, a central Fibre Channel switch 102 can control channels 104, or links between the N_Port devices 106, 108, 110, 112, 114, 116, 118, and 120. Examples of N_Port devices include instrumentation 106, web servers 108, back-up storage 110, and disk arrays 112, which may include RAIDs (redundant arrays of inexpensive disks) or JBODs (Just a Bunch of Disks), printers 114, workstations 116, and super-servers 118. The versatility of Fibre Channel further allows standard connections to external networks 120, including outside communications and computer networks. Thus, as is relevant to this invention, the Fibre Channel protocol can support communication links using network protocols with unsolicited data arriving. This arriving data must be managed and resources must be assigned in a contemporaneous manner. The context of the transmitting data should be managed in an efficient manner. This embodiments disclosed herein therefore relate to a system and method for efficiently managing the context of such Fibre Channel frames.

Figure 2:
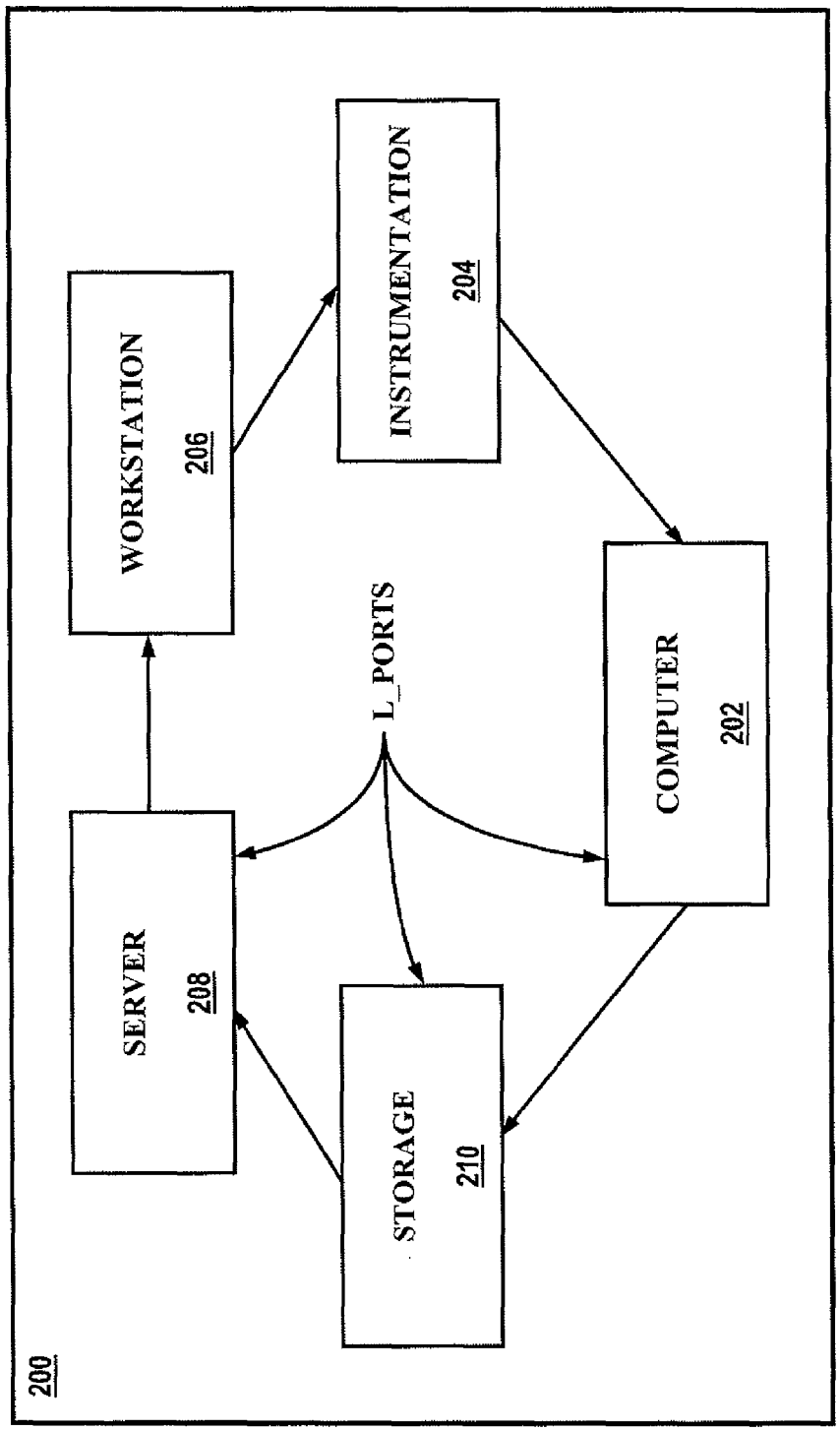
FIG. 2 illustrates a block diagram of an I/O Interface in an articulated loop configuration in accordance with one embodiment of the present invention.

FIG. 2 illustrates a block diagram of an I/O Interface architecture in an articulated loop configuration in accordance with one embodiment of the present invention. The example depicted in FIG. 2 generally indicates a Fibre Channel loop architecture 200, in which the routing and linking between, and in some cases among, devices is governed by the L_port devices 202, 204, 206, 208 and 210. Examples of the L_Port devices include the same set of devices as the N_Port devices. By example and without limitation are shown in FIG. 2 computer 202, instrumentation 204, workstation 206, server 208, and storage devices 210. Thus, as is relevant to this invention, the Fibre Channel protocol must support communication links using network protocols with unsolicited data arriving. This arriving data should be managed and resources must be assigned in an efficient manner.

Figure 3:
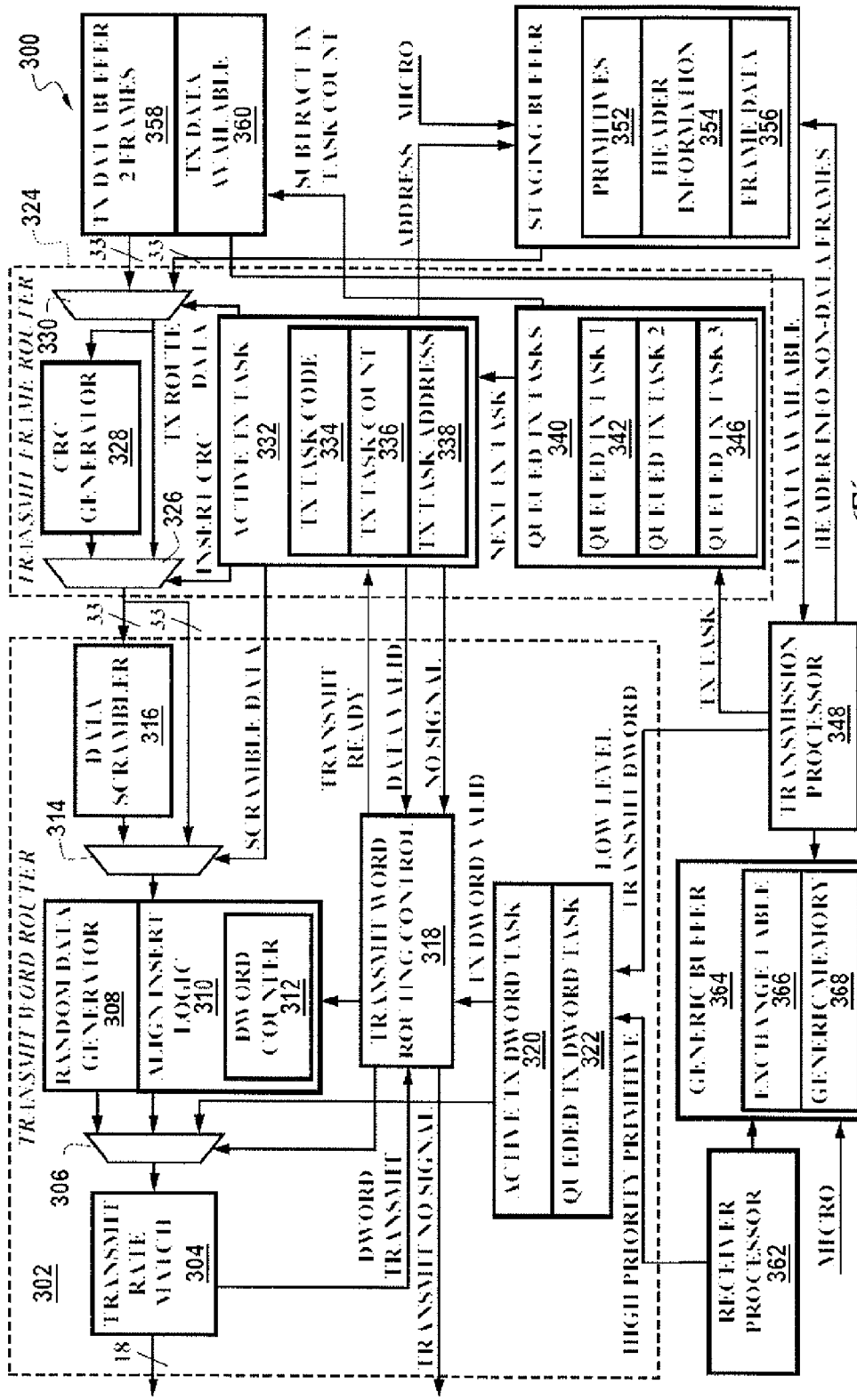
FIG. 3 illustrates a block diagram of a system, which can be implemented in accordance with a preferred embodiment of the present invention.

FIG. 3 illustrates a block diagram of a system 300, which can be implemented in accordance with a preferred embodiment of the present invention. System 300 generally includes transmit word router 302 that is composed of a random data generator 308 that can communicate with an ALIGN insert logic module 310. A transmit word routing control 318 transmits data to ALIGN insert logic module 310. Note that the ALIGN insert logic module 310 also includes a Dword counter 312. Data from random data generator 308 can be transmitted to a logic module 306, whose output data is transmitted to a transmit rate match function 304. Data from ALIGN insert logic module 310 can also be transmitted to logic function 306.

Transmit word router 302 also includes a data scrambler 316, which can transmit data to a logic module 314. Transmit word router 302 further includes an active function module 320 and a queued function module 322. Active function module 320 provides an "Active Tx DWord Task" and queued function module 322 provides a "Queued Tx Dword Task". Data from the active function module 322 can be transmitted to logic module 306 and to transmit word routing control module 318 (i.e., Tx DWord Valid). Transmit word router 302 can control the priority for DWord transmission. For example, if there are currently no requests to transmit, transmit word router 302 can automatically default to random data generator 308 (i.e., random scrambled data) as defined by the SAS standard. Such a situation permits the processor described herein to manage frames and control sequences without requiring the management of low layers of protocol.

Note that the ALIGN Insertion Logic and data scrambling logic (i.e., random data generator 308) depicted in FIG. 3 can be specific to the SAS protocol. The Active Tx DWord Task and Queued Tx DWord Task are sets of two registers that allow the Processor to send a custom DWord or Primitive, independent of the contents of the Tx Task Queue. Such a scenario can be utilized for high priority primitive handling.

System 300 further includes a transmit frame router 324 that is composed of a CRC generator 328, an Active Tx Task module 332, a Task queue 340 (i.e., labeled "Queued Tx Tasks), and logic module 326 and 330. Note that the term "Tx" as utilized in FIG. 3 generally refers to the term "transmission". The Active Tx Tasks module 332 is composed of a Tx Task Code module 334, a Tx Task Count module, and Tx Task Address module 338. The Task queue 340 can be composed of respective queued first, second and third tasks 342, 344, 346.

Data from a transmission processor 348 (i.e., can be transmitted to task queue 340. Data from the transmission processor 348 can also be sent to a generic buffer 364 and/or to the active function module 322 of the transmit word router 302. Note that generic buffer 364 generally includes an exchange table 366 and a generic memory 368. The Tx Task Queue 340 can contain more tasks if necessary to allow for greater queuing while permitting the processor to achieve greater processing times between tasks. Note that another Tx Task can be added when Tx Task Queue 340 is utilized in a Fibre Channel design.

The transmission processor 348 can send frames or primitives (i.e., data) by writing Tx Tasks to the transmit frame router 324. Transmission processor 348 can be implemented as a custom processor that drives the task queue 340, which in turn drives the lower level logic in the transmit frame router 324, which assembles and routes the different pieces of frames and then formats such frames correctly for subsequent transmission through the transmit word router 302. The active Tx Task module 332 together with the Task queue 340 (i.e., labeled "Queued Tx Tasks) form a Tx Task Queue structure that allows the transmission processor 348 to program all the tasks, and also to assemble, format and transmit a frame and then proceed to perform other tasks while the frame is transmitted (e.g., such as evaluating transmit priorities and queuing the next frame).

Such a task queue structure allows the flexibility of processor control with the performance of custom hardware. The transmission processor 348 can also manage connections and control protocols utilizing the Tx Tasks in SAS. The transmission processor 348 can open a connection by sending an Open Frame and then managing the connection by sending appropriate frames until it sends a CLOSE primitive sequence. The Tx Task Queue also allows flexibility and control for managing the protocol sequences other than merely frame transmission.

The task queue structure formed by Tx Task module 332 together with the Task queue 340 generally contains a count of the number of Double Words (i.e., Dwords) to transmit, along with an address (e.g., Tx Task Address 338) for RAM access, a RAM select bit and configuration bits that control CRC generation (i.e., see CRC generator 328), scrambling and other protocol control bits.

The transmission processor 348 loads a task into the task queue 340 and electronic hardware thereof can process that task and transmit information on the link thereof. Such hardware can therefore select between a FIFO (Dual Port RAM) and/or a generic RAM that the transmission processor 348 can load. Note that other control bits can be utilized to control the sending of "primitives" (i.e., encoding the DWord as a primitive), such as SOF, EOF, and other control characters that manage the control in SAS. Such a feature therefore permits system 300 to possess the necessary flexibility to control other protocol aspects.

An example of a generic RAM is generic buffer 364, while an example of a FIFO or dual port RAM are active function module 320 and a queued function module 322. Note that as utilized herein, the term "RAM" refers to "Random Access Memory". Such a configuration allows transmission processor 348 to load frame header information and primitives into the generic RAM (i.e., generic buffer 364) well before issuing the transmit task. Transmission processor 348 can then assemble a frame by issuing a given number of transmit tasks to send the appropriate information from the different RAMs.

Note that the Generic Buffer, Staging Buffer, and the Tx Data Buffer depicted in FIG. 3 can all be implemented as Dual Port RAMS. The Tx Data Buffer generally operates as a FIFO, but the Active and Queued Tx DWords respectively indicated by reference numerals 320 and 322 are merely registers that operate like a Queue. The Tx Data Buffer 358 is probably a better example of a FIFO. The reason the Staging Buffer 350 requires to be a Dual-Port RAM is that the Tx Frame Router needs to be able to read the memory at the same time that the Processor is writing to a different location in the memory for assembling the next frame or control sequence.

For example, to transmit an SAS data frame, the transmission processor 348 would first load the generic RAM or generic buffer 364 with SOF primitive address A, the EOF primitive at address B, the header information (i.e., 6 double words) starting at location C, and the data will be contained in the data FIFO. To send the frame, transmission processor 348 loads the transmit task queue 340 with 4 tasks: 1. send primitive from address A; 2. send header DWords from address C; 3. send 512 data Dwords from data FIFO 358; and 4. send primitive from address B. At this point, hardware associated with system 300 can transmit the first data frame and the processor 348 is free to assemble the next frame and program the tasks for that frame. Such an architecture allows the transmission processor 348 to stay ahead, because a gap in performance is not present, and flexibility exists for changing the data transmitted to meet protocol requirements.

A receiver module 362 can also transmit data to generic buffer 364 and to the queued function module 322 of the transmit word router 302. Receiver module 362 can be implemented as a custom processor, including software modules thereof. The receiver module 362 can react to primitives and transmit such primitives by writing Tx DWord register data directly. It can be appreciated that the use of receiver module 362 is described herein for illustrative purposes only and is not a required feature of the invention. Other configurations can be implemented, which do not utilize receiver module 362, but which still operate according to the spirit and scope of the embodiments disclosed herein.

The transmission processor 348 transmits header data into non-data frames. Such data is transmitted to a staging buffer 350 that includes primitives 352, header information 354, and frame data 356. Address information can also be provided to the staging buffer 350 from the Tx Task Address module 338 of the Active Tx Tasks module 332. System 300 further includes a data buffer 358 (i.e., "TX Data Buffer") that is composed of 2 frames and a data available space 360. Output from the data buffer can be provided to logic module 330 along with data from staging buffer 350. Available from data available space 360 can be transmitted to the transmission processor 348.

Transmission processor 348 can be associated with an I/O interface, such as Fibre Channel. Transmission processor 348 can generically assembles a first frame from among a plurality of frames, transmits the first frame from among the plurality of frame data over the I/O interface and thereafter processes and assemble a subsequent frame from among the plurality of frames while the first frame (or prior frame) is transmitting, thereby providing enhanced flexibility and speed for the assembly and transmission of the plurality of frames across the I/O interface.

Note that embodiments of the present invention can be implemented in the context of modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Software modules generally are composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

Transmission processor 348 can be implemented, for example, in the context of one or more modules. Such a module can therefore process and manage a group of frames for transmission thereof. Such a module can be stored as a plurality of instructions in a memory associated with a processing unit and thereafter processed by the processing unit. Such a module can, for example, include or be associated with a queue of transmit tasks that contain a count of the number of double words to transmit, an address for RAM access, a RAM select bit, and configuration bits that control CRC generation, scrambling and protocol control bits.

Based on the foregoing, it can be appreciated that the embodiments disclosed herein are generally directed toward data-processing systems and methods, including an I/O interface for managing the transfer of data between a processor and one or more memory locations. A processor can be associated with the I/O interface, such that the processor generically assembles a first or prior frame from among a plurality of frames, transmits the first or prior frame from among the plurality of frames over the I/O interface and thereafter processes and assembles a subsequent or second frame from among the plurality of frames while the first frame is transmitting, thereby providing enhanced flexibility and speed for the assembly and transmission of the plurality of frames across the I/O interface.

The processor itself can be structured to include a task queue containing a plurality of transmit tasks for transmitting the plurality of frames over the I/O interface, at one or more processing units for executing the plurality of transmit tasks, a memory; and interface logic for accessing the memory and the task queue. The processing unit can be implemented as a custom processor for driving the task queue. A transmit word router can also be provide, which communicates with a transmit frame router that includes the actual task queue.

Additionally, a plurality of buffers can be provided for maintaining the plurality of frames prior to, during and after transmission of the plurality of frames. Such buffers or memory locations can include a data buffer, a staging buffer, and/or a generic buffer. Such buffers may constitute Random Access Memory (RAM). The I/O interface may be a Fibre Channel interface, a Serial Attached SCSI (SAS) interface, and the like. Note that the TX task queue and association hardware can also permit the use of a standard processor core without much effect on performance, thereby allowing a processing to be utilized in-path. Of course, it can be appreciate that a variety of other types of processors may be implemented in accordance with alternative embodiments.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. For example, embodiments disclosed herein can apply to any protocol that utilizes a frame format for transferring data.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A data-processing system, comprising:
   an I/O interface for managing the transfer of data directly between a processor and at least one memory, said processor associated with said I/O interface;
   a task queue, wherein said processor comprises said task queue, said task queue containing a plurality of transmit tasks for transmitting a plurality of frames over said I/O interface, at least one processing unit for executing said plurality of transmit tasks, said memory, and interface logic for accessing said memory and said task queue;

a transmit word router that communicates with a transmit frame router comprising said task queue;

wherein said processor assembles a first frame from among said plurality of frames containing primitives, header information, and frame data, transmits said first frame from among said plurality of frames over said I/O interface wherein said transmitting comprises of sending only said primitive from one address, sending only said leader information from another address, sending only said frame data from a data FIFO, and sending only another said primitive from yet another address and thereafter processes and assembles a subsequent frame from among said plurality of frames while said first frame is transmitting to a recipient, thereby providing enhanced flexibility and speed for the assembly and transmission of said plurality of frames across said I/O interface;

wherein said at least one processing unit comprises a custom processor that includes a module for driving said task queue.

2. The system of claim 1 wherein said processor further comprises:
a task queue containing a plurality of transmit tasks for transmitting said plurality of frames over said I/O interface;
at least one processing unit for executing said plurality of transmit tasks;
a memory; and
interface logic for accessing said memory and said task queue.

3. The system of claim 1 wherein said at least one processing unit comprises a custom processor for driving said task queue.

4. The system of claim 1 further comprising a plurality of buffers comprising: a data buffer, a staging buffer, and a generic buffer.

5. The system of claim 1 wherein said I/O interface comprises a Fibre Channel interface.

6. The system of claim 1 wherein said I/O interface comprises an SAS (Serial Attached SCSI) interface.

7. The system of claim 1 further comprising a plurality of buffers for maintaining said plurality of frames prior to, during and after transmission of said plurality of frames, wherein said plurality of buffers comprises: a data buffer, a staging buffer, and a generic buffer.

8. The system of claim 1 further comprising a transmit word router that communicates with said transmit frame router comprising said task queue.

9. The system of claim 1 wherein said processor comprises a module for processing and managing said plurality of frames.

10. A data-processing method, comprising the steps of:
managing the transfer of data directly between a processor and at least one memory utilizing an I/O interface;
associating said processor with said I/O interface;
automatically assembling a first frame from among a plurality of frames utilizing said processor wherein said first frame contains primitives, header information, and frame data;
automatically transmitting said first frame from among said plurality of frames over said I/O interface utilizing said processor wherein said transmitting comprises of sending only said primitive from one address, sending only said header information from another address, sending only said frame data from a data FIFO, and sending only another said primitive from yet another address; and
thereafter automatically processing and assembling a subsequent frame from among said plurality of frames utilizing said processor while said first frame is transmitting to a recipient, thereby providing enhanced flexibility and speed for the assembly and transmission of said plurality of frames across said I/O interface.

11. The method of claim 10 further comprising the steps of configuring said processor to comprise:
a task queue containing a plurality of transmit tasks for transmitting said plurality of frames over said I/O interface;
at least one processing unit for executing said plurality of transmit tasks;
a memory; and
interface logic for accessing said memory and said task queue.

12. The method of claim 11 further comprising the steps of:
configuring said at least one processing unit as a custom processor; and
driving said task queue utilizing said at least one processing unit.

13. The method of claim 11 further comprising the step of providing a transmit word router that communicates with a transmit frame router comprising said task queue.

14. The method of claim 13 wherein said plurality of buffers comprises: a data buffer, a staging buffer, and a generic buffer.

15. The method of claim 14 wherein said processor comprises a module for processing and managing said plurality of frames.

16. The system of claim 14 wherein said I/O interface comprises a Fibre Channel interface.

17. The method of claim 10 further comprising the step of providing a plurality of buffers for maintaining said plurality of frames prior to, during and after transmission of said plurality of frames.

18. The system of claim 10 wherein said I/O interface comprises an SAS (Serial Attached SCSI) interface.

* * * * *